No. 760,425. Patented May 24, 1904.

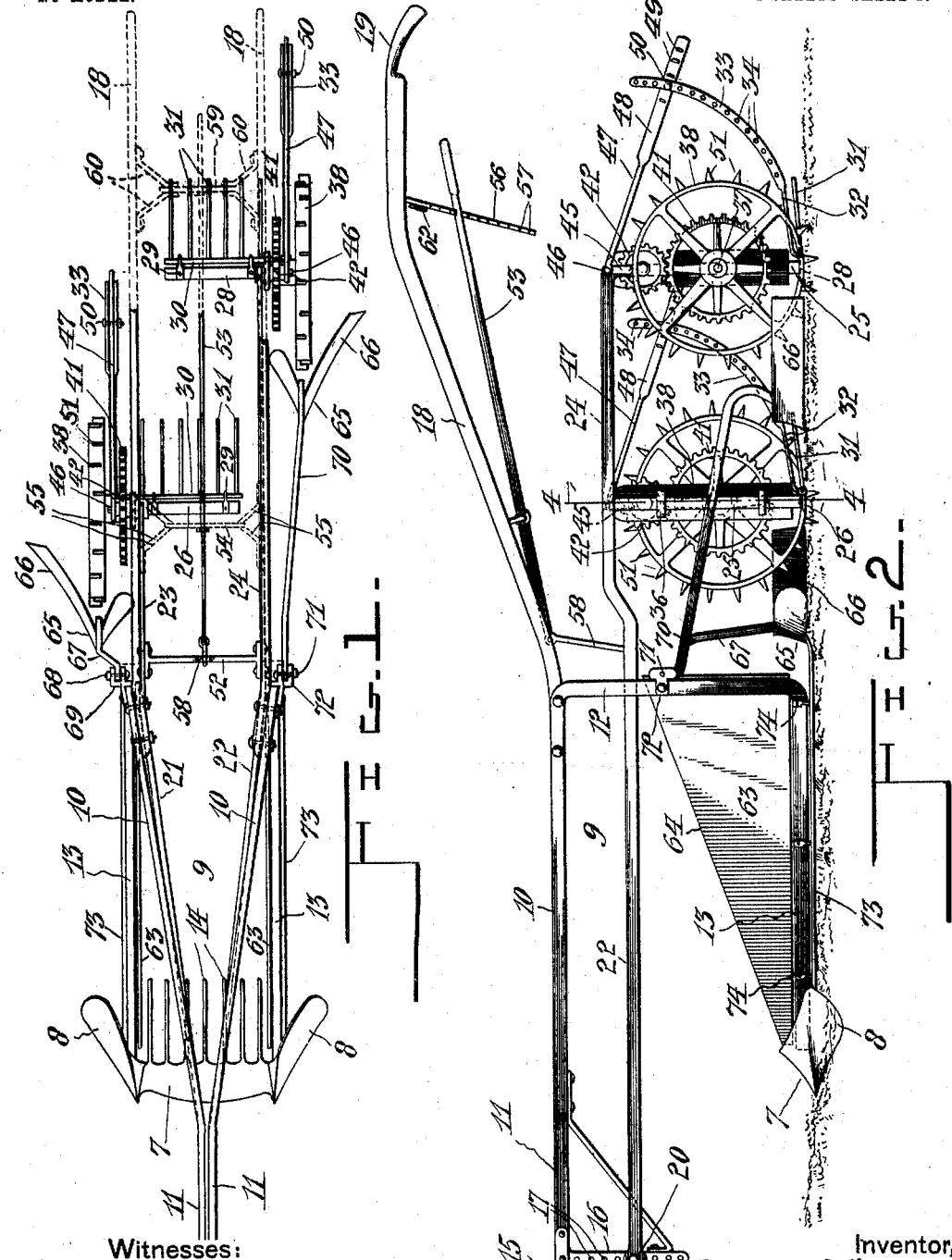

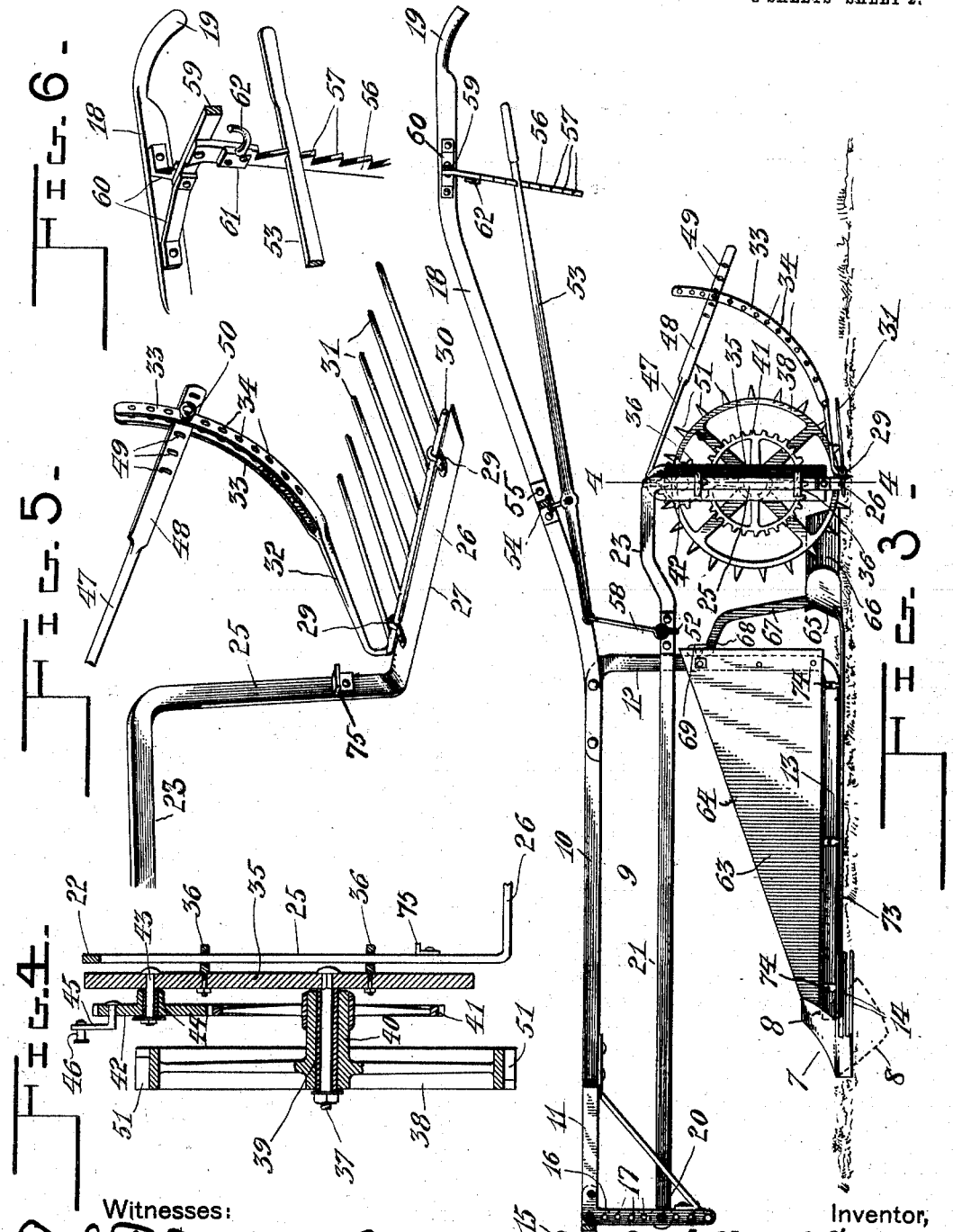

UNITED STATES PATENT OFFICE.

ANTHONY O. CONNOR, OF LOMBARDY, CANADA.

POTATO-DIGGER.

SPECIFICATION forming part of Letters Patent No. 760,425, dated May 24, 1904.

Application filed March 4, 1903. Serial No. 146,177. (No model.)

*To all whom it may concern:*

Be it known that I, ANTHONY O. CONNOR, a subject of the King of Great Britain, residing at Lombardy, in the county of Leeds, in the Province of Ontario, Canada, have invented certain new and useful Improvements in Potato-Diggers; and I do hereby declare that the following is a full, clear, and exact description of the invention, such as will enable others skilled in the art to which it appertains to make and use the same.

My invention relates to potato-diggers or implements of a similar nature which are adapted for removing vegetables or roots of this kind from the ground. This is effected by scooping up the potatoes and earth and bringing about their separation from the earth so that they are brought to the surface, facilitating their removal from the field. This process is effected by throwing the earth and potatoes successively upon screens or grates the bars of which allow the earth to pass but retain the potatoes.

The object of this invention is to provide an improved construction for an implement of this kind with a view to facilitating the separation of the potatoes from the earth. The invention contemplates the agitation or shaking of the said bars or screens as the implement is drawn along by a horse, facilitating the descent of the earth between the bars.

The invention consists in the construction and combination of parts to be more fully described hereinafter and definitely set forth in the claims.

In the drawings, which fully illustrate my invention, Figure 1 represents the same in plan, a portion of the draft mechanism being represented as broken away. Fig. 2 represents the implement in side elevation. Fig. 3 represents the implement in central longitudinal section. Fig. 4 is an enlarged vertical section taken substantially on the line 4 4 of Fig. 2. Fig. 5 represents in perspective a portion of the implement. Fig. 6 represents also in perspective another portion of the implement.

Throughout the drawings and specification the same numerals of reference denote like parts.

Referring to the parts more particularly, 7 represents a scoop or plow comprising outwardly-inclined moldboards 8, disposed at each side, as indicated, and this plow is carried upon a frame 9. This frame comprises inclined members 10, which have forward extensions 11, which are united, as shown. These members further comprise vertically-disposed portions 12, which terminate below in forwardly-projecting extensions 13, to the extremities of which is attached the aforesaid plow 7. As indicated, the plow 7 includes a plurality of rearwardly-projecting bars 14, the purpose of which will appear more fully hereinafter.

At their forward extremities the extensions 11 carry a suitable draft-iron 15, which comprises a depending member 16, which member is provided with a plurality of openings or holes 17 for a purpose which will appear. This draft-iron enables an animal to be attached for the purpose of drawing the implement along in a manner similar to that of an ordinary plow, and in furtherance of this purpose the frame 9 is provided with a pair of rearwardly-projecting upwardly-inclined handles 18, which terminate in suitable grips 19 to be grasped by the hand.

On each side of the member 16 and by means of a common pivot 20 the reaches 21 and 22 are attached. As indicated, these reaches diverge rearwardly from the member 16 and comprise extensions 23 and 24, respectively, which are substantially parallel and located at substantially the same distance apart as the aforesaid handles 18. A portion of the extension 23 is represented in Fig. 5, where it should appear that it comprises a substantially vertical portion 25, which portion terminates in a substantially horizontal lateral extension 26. This extension 26 has a comparatively sharp forward edge 27, so that it constitutes a blade, as it were, adapted to cut through the earth. A similar arrangement is adopted with respect to the extension 24. It should appear, however, that in this case the extension 24, which corresponds to the extension 23, is of great length. It terminates, however, in a lateral extension or blade 28, which is substantially similar to the part 26, already described. The parts 26 and 28 have attached to them near their rear edges, respectively, a pair of eyes or bearings 29, in which are rotatably mounted the round bars 30, to which bars are attached a plurality of rearwardly-projecting bars or fingers 31, constituting a scuffle-frame. It should be understood that these bars 31 are substantially similar to the bars 14, already described, except that they are all mounted upon the common support 30, as stated. The bars 30 are provided at their outer extremities with arms 32, which incline upwardly and to the rear and terminate in bifurcated arcuate extensions 33, which are provided with a plurality of openings 34 in the manner shown. Arrangement is made for raising and lowering these extensions 33 as the implement proceeds, whereby the plurality of arms 31 are raised and lowered upon the bearings 29, so as to bring about the desired separation of the potatoes and earth. The mechanism for this purpose will now be described.

Referring especially to Fig. 4, it should appear that the vertical portion 25 has mounted upon it an elongated plate 35. This plate may be attached by means of the eyes 36, through which the member 25 passes loosely, in this manner permitting a relative vertical movement between the parts, as will be readily understood. Near the lower portion of this plate it carries rigidly a stud 37, which constitutes a spindle for a driving-wheel 38, mounted upon it. A lining-sleeve 39 may be provided at this point, as indicated, and it should appear that the hub 40 of the wheel 38 carries rigidly a gear 41. This gear 41 meshes above with a pinion 42, which is rotatably mounted upon a stud 43, carried by the aforesaid plate 35, a suitable wearing-sleeve 44 being provided at this point also. The pinion 44 carries rigidly an arm 45, which constitutes a crank and which carries a pin 46 in the manner shown. To the pin 46 is attached the extremity of a link 47, which extends rearwardly and terminates in a flat extension 48, provided with a plurality of laterally-elongated openings 49. This flat extension 48 is received between the forks of the aforesaid bifurcated extension 33, to which it is pivotally attached by means of a removable pin 50. It should be stated that the driving-wheel 38 is adapted to rest upon the ground and will be rotated by the advance of the implement. In furtherance of its purpose it is provided with spurs or teeth 51, which engage the ground. From this arrangement it should appear that as the implement advances the members 31, or the frame which they constitute, will be vibrated up and down upon the bars 30 as an axis, it being understood that an arrangement is adopted in connection with the member 28 which is substantially similar to that just described, the corresponding parts being designated by the same numerals, as will appear. The reaches 21 and 22 are connected by a cross-bar 52, which enables them both to be raised or lowered simultaneously. For this purpose a controlling-lever 53 is provided, which is disposed, as shown, substantially midway between the handles. This lever is pivotally mounted to a cross-bar 54, the extremities of which are attached to Y-brackets 55, which are secured to the handles 18. Toward the rear a vertically-disposed ratchet or rack-bar 56 is provided. (Most clearly illustrated in Fig. 6.) It is provided with downwardly-projecting teeth 57, which are adapted to engage the upper side of the aforesaid lever 53 in the manner indicated. The forward extremity of the lever 53 is connected with the link 58, the lower extremity of which is attached to the aforesaid cross-bar 52. From this arrangement evidently the reaches may be simultaneously raised or lowered and maintained at any desired height. The aforesaid ratchet 56 is rigidly secured at its upper extremity to a cross-bar 59, the extremities of which are carried in Y-brackets 60, as indicated, secured to the handles 18. Near its upper extremity the ratchet-bar 56 carries rigidly a plate 61, comprising a hook 62. Over this hook the lever 53 may rest, so as to maintain the reaches at such a height that the members 26 and 28 will be held elevated above the ground.

In order to prevent any possibility of trailing vines or weeds impeding the progress of the implement by becoming entangled in the frame 9, I provide the same at each side with clearing-plates 63, which are attached, as indicated, to the vertical portions and horizontal portions 12 and 13. Their upper edges 64 are inclined, as shown, so that vines which pass across the frame at this point will be cut off or pulled up as the implement advances.

In order to clear the track for the driving-wheels 38, I provide guards 65, which are disposed just in front of them in the manner shown, comprising wings 66, adapted to deflect objects out of the path of the wheels. The guard at the right of the implement is carried on an arm 67, which is pivoted at 68 to a bracket 69, carried by the corresponding vertical member 12. The guard at the left is carried upon an arm 70, which is pivoted at 71 to a bracket 72, carried in a similar manner.

The members 13 of the frame are provided on their lower sides with runners 73, which consist, substantially, of long flat plates attached to them by small clips 74 and which are adapted to support the weight of the rear portion of the frame upon the soft earth, as will be readily understood.

The mode of operation of the implement will now be described. As the plow 7 is dragged along through the earth it scoops up the potatoes and earth, which pass over the bars 14, between which a large proportion of the dirt readily falls. In this manner many of the potatoes are brought to the surface and others brought nearer to the surface of the earth. As the implement advances farther the members 26 and 28, which are dragging along in the loose earth, afford means for further uncovering the potatoes. It should be understood that these bars pass along at a considerable depth in the earth, so that the partially-exposed potatoes will pass above the scuffle-frames which they carry. These scuffle-frames are vibrating continuously, movement being transmitted to them from the driving-wheels 38 through the mechanism described in connection with them. The tendency to separate the earth and potatoes by means of these scuffle-frames is much assisted by the vibratory movement which is given to them, the earth passing between them, as will be readily understood. It should appear that the scuffle-frames project substantially across the space between the two handles, so that the potatoes are first subjected to the action of the forward scuffle-frame, and the process of raising them from the earth is completed by the second frame.

Unevennesses in the ground are anticipated by mounting the plates 35 so that they may slide vertically. From this arrangement the scuffle-bars are maintained at a substantially constant depth, while the driving-wheels 38 roll along over the earth and accommodate themselves to the profile of the same. A stop 75, consisting of a small angle-clip, is attached to the vertical members of the reaches to limit the downward movement of the plates 35, as illustrated in Fig. 4.

It will be remembered that in connection with the description of the links 47 the openings 49 were described as elongated laterally of the extension 48. This is done for the purpose of making a loose joint at this point, so that a rattling or shaking due to the loose connection will add to the efficiency of the scuffle-frames.

While I have shown in the accompanying drawings the preferred form of my invention, it will be understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim as new, and desire to secure by Letters Patent, is—

1. In an implement of the class described, in combination, a frame, a plow carried thereby, a pair of reaches pivotally attached to said frame and extending rearwardly therefrom, substantially horizontal bars carried by said reaches and adapted to be dragged through the earth raised by said plow, scuffle-frames carried by said bars, means for agitating said scuffle-frames by the advance of said implement, and means for locking said reaches in a plurality of positions with respect to said frame.

2. In an implement of the class described, in combination, a frame, a plow carried thereby, a pair of connected reaches pivotally attached near the forward portion of said frame, said reaches having substantially vertical rear extensions behind said plow, scuffle-frames carried by said extensions, means for agitating said scuffle-frames by the advance of said implement, handles attached to said frame and projecting rearwardly therefrom, a lever, means for pivotally mounting said lever between said handles, a link connecting said lever with said reaches, and means for locking said lever in a plurality of positions.

3. In an implement of the class described, in combination, a plow, a member adapted to be drawn through the earth behind said plow and having a substantially vertical portion, a plate slidably mounted upon said vertical portion, a driving-wheel carried by said plate, a scuffle-frame pivotally mounted on an extension from the lower extremity of said vertical portion, and means for transmitting movement from said driving-wheel to said scuffle-frame.

4. In an implement of the class described, in combination, a plow, a substantially vertically disposed member, a scuffle-frame carried thereby and disposed transversely behind said plow, a plate, means for vertically guiding said plate upon said member, a driving-wheel mounted upon said plate, a link adapted to transmit movement to said scuffle-frame, and mechanism carried by said plate for transmitting movement from said driving-wheel to said link.

5. In an implement of the class described, in combination, a plow, a scuffle-frame disposed behind said plow, a driving-wheel, means for transmitting movement from said driving-wheel to said scuffle-frame, said means comprising connections with enlarged openings, whereby irregularity in the movement transmitted is effected.

6. In an implement of the class described, in combination, a plow, a frame carrying the same, said frame comprising substantially vertically disposed members having horizontal extensions, and substantially vertically disposed plates carried in the angle between said horizontal extensions and said vertical members, said plates having edges which incline upwardly toward the rear.

7. In an implement of the class described, in combination, a plow, a scuffle-frame disposed transversely therebehind, a driving-wheel, means for transmitting movement from said driving-wheel to said scuffle-frame, means for vertically guiding said driving-wheel, and a stop adapted to limit the vertical movement of said driving-wheel.

8. In an implement of the class described, in combination, a plow, a scuffle-frame disposed transversely behind said plow, means for supporting said scuffle-frame upon a substantially horizontal axis, a driving-wheel, a rotatable member driven thereby, a bifurcated curved arm rigid with said scuffle-frame and having a plurality of openings therethrough, a link connecting said rotatable member with said curved arm, said link having a plurality of elongated openings adjacent to said curved arm, and a pin adapted to pass through said openings to connect said link to said curved arm.

9. In an implement of the class described, in combination, a frame, a plow, a reach extending rearwardly behind said plow, said reach having a substantially vertical extension, a plate movably mounted upon said extension, a driving-wheel mounted upon said plate, a scuffle-frame carried below said extension, and mechanism connecting said scuffle-frame with said driving-wheel to agitate said scuffle-frame.

10. In an implement of the class described, in combination, a frame, a plow, a reach extending rearwardly behind said plow, and having a substantially vertical extension, a plate movably mounted upon said vertical extension, a wheel carried by said plate and adapted to run upon the ground, a gear-wheel rigid with said wheel, a pinion meshing with said gear-wheel, said vertical extension having a substantially horizontal extension, a scuffle-frame carried by said last extension, and a link connecting said pinion with said scuffle-frame.

In witness whereof I have hereunto set my hand in the presence of two witnesses.

ANTHONY O. CONNOR.

Witnesses:
   S. A. STEWARD,
   J. M. ROGERS.